(12) United States Patent
Son et al.

(10) Patent No.: US 10,673,935 B2
(45) Date of Patent: Jun. 2, 2020

(54) CLOUD SERVICE BROKER APPARATUS AND METHOD THEREOF

(71) Applicant: Electronics and Telecommunications Research Institute, Daejeon-si (KR)

(72) Inventors: Seok Ho Son, Daejeon-si (KR); Dong Jae Kang, Daejeon-si (KR); Jin Mee Kim, Daejeon-si (KR); Hyun Joo Bae, Daejeon-si (KR); Ji Hyun Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 16 days.

(21) Appl. No.: 14/974,704

(22) Filed: Dec. 18, 2015

(65) Prior Publication Data
US 2017/0041384 A1    Feb. 9, 2017

(30) Foreign Application Priority Data

Aug. 4, 2015    (KR) .......................... 10-2015-0110184

(51) Int. Cl.
| H04L 29/08 | (2006.01) |
| G06F 9/46 | (2006.01) |
| H04L 12/24 | (2006.01) |

(52) U.S. Cl.
CPC ............ H04L 67/1002 (2013.01); G06F 9/46 (2013.01); H04L 41/5006 (2013.01); H04L 67/2809 (2013.01)

(58) Field of Classification Search
CPC ............ H04L 67/1002; H04L 41/5006; H04L 67/2838; H04L 67/2809; H04L 29/08774; H04L 67/325; H04L 67/327; G06F 9/46
USPC ........................................................ 709/226
See application file for complete search history.

(56) References Cited

U.S. PATENT DOCUMENTS

| 9,311,912 B1* | 4/2016 | Swietlinski | ............. G10L 13/04 |
| 2011/0145094 A1* | 6/2011 | Dawson | ................ G06F 9/5027 705/26.63 |
| 2012/0016721 A1* | 1/2012 | Weinman | ............... G06Q 10/06 705/7.35 |
| 2012/0060165 A1* | 3/2012 | Clarke | .................. G06F 9/5038 718/104 |
| 2012/0179824 A1* | 7/2012 | Jackson | ................ G06F 9/5027 709/226 |

(Continued)

FOREIGN PATENT DOCUMENTS

| KR | 10-2012-0116773 A | 10/2012 |
| KR | 10-1495767 B1 | 3/2015 |

OTHER PUBLICATIONS

Tordsson, J. et al., "Cloud brokering mechanisms for optimized placement of virtual machines across multiple providers," Future Generation Computer Systems, vol. 28, pp. 358-367, (2012).

*Primary Examiner* — Thu V Nguyen
*Assistant Examiner* — Lam H Duong
(74) *Attorney, Agent, or Firm* — Rabin & Berdo, P.C.

(57) ABSTRACT

A cloud service broker apparatus and method thereof are provided. The cloud service broker apparatus includes a controller configured to provide a brokerage service between a plurality of cloud service providers and a cloud service user by dividing a cloud service requested by the cloud service user into a plurality of cloud service segments and distributing each of the cloud service segments to each of the clouds.

9 Claims, 9 Drawing Sheets

(56) References Cited

U.S. PATENT DOCUMENTS

| | | | |
|---|---|---|---|
| 2014/0173594 A1* | 6/2014 | Ng | G06F 9/45533 |
| | | | 718/1 |
| 2014/0201738 A1 | 7/2014 | Choi et al. | |
| 2014/0325515 A1* | 10/2014 | Salmela | G06F 9/45533 |
| | | | 718/1 |
| 2014/0337532 A1* | 11/2014 | Arnette | G06F 9/4881 |
| | | | 709/226 |
| 2015/0026346 A1 | 1/2015 | Yoon et al. | |
| 2015/0067171 A1* | 3/2015 | Yum | G06F 9/5072 |
| | | | 709/226 |
| 2017/0017960 A1* | 1/2017 | Subramaniam | G06Q 30/06 |

* cited by examiner

CLOUD SERVICE BROKER APPARATUS AND METHOD THEREOF

CROSS-REFERENCE TO RELATED APPLICATION(S)

This application claims priority from Korean Patent Application No. 10-2015-0110184, filed on Aug. 4, 2015, in the Korean Intellectual Property Office, the disclosure of which is incorporated herein by reference in its entirety.

BACKGROUND

1. Field

The following description relates to a cloud service, and more particularly, to a cloud service integration and brokerage.

2. Description of the Related Art

A cloud service broker apparatus provides a brokerage service to enable a cloud service user to use a cloud offered by a cloud service provider. The cloud service broker selects a cloud suitable for the cloud service user from among associated multiple clouds, and controls a cloud service to be deployed and executed in the selected cloud and delivered to the cloud service user.

The cloud service broker may earn arbitrage profit from the brokerage service between the cloud service providers and the cloud service user, or it may only serve as a tool for the cloud service user to select a suitable cloud. Hence, to increase the profit or user satisfaction, the cloud service broker may need to select an optimal cloud that can create profit while satisfying the user's desired quality of service requirements.

SUMMARY

The following description relates to a cloud service broker apparatus and method thereof which can create profit for a cloud service broker while satisfying a cloud service user's desired quality of service requirements.

In one general aspect, there is provided a cloud service broker apparatus including: a controller configured to provide a brokerage service between a plurality of cloud service providers and a cloud service user by dividing a cloud service requested by the cloud service user into a plurality of cloud service segments and distributing each of the cloud service segments to each of the clouds.

The controller may divide a single cloud service requested by the cloud service user into the plurality of cloud service segments based on service prices, and distribute each of the cloud service segments to each of the clouds.

The controller may provide the cloud service user with a single access address such that the cloud service user recognize the cloud service segments as a single cloud service.

In another general aspect, there is provided a cloud service broker apparatus including: an analyzer configured to analyze cloud information and requirements of a cloud service user for a cloud service request; a service divider configured to divide the requested cloud service into a plurality of cloud service segments according to time intervals based on an analysis from the analyzer; and a service allocator configured to distribute and place each of the plurality of cloud service segments in each of clouds using mapping information of the cloud service segments and the clouds.

The cloud information may include types of cloud services provided by a cloud, a service provide and Service Level Agreement (SLA), and the requirements for requested cloud service may include a cloud service user's desired service price, type and performance level of requested cloud service.

The service divider may select an available cloud group consisting of clouds that can provide the cloud service requested by the cloud service user, compare service prices among the clouds belonging to the available cloud group, time-divide the requested cloud service into the plurality of cloud service segments, each of which allows the service price to remain in the lowest during each of the time intervals, and designate each of the clouds to each of the cloud service segments.

The service divider may compare service prices among clouds that belong to an available cloud group, select a cloud that provides the lowest service price at a designated time point, and select a cloud service provided by the selected cloud as a cloud service segment for a time interval from the designated time point until another cloud provides a lower service price.

The service divider may perform service segmentation on the requested cloud service and switch one cloud service segment to another cloud service segment at each time point at which service price lines of adjacent clouds cross each other, and repeatedly perform the cloud service segmentation on a total length of the requested cloud service.

The service allocator may request a designated cloud for placement of a cloud service segment at a time of use of the requested cloud service, or schedule placement of a cloud service segment in a designated cloud in order for the cloud service user to use the requested cloud service at a desired time.

The cloud service broker apparatus may further include a service manager configured to provide a single access address to the cloud service user such that the cloud service user recognizes the divided cloud service segments as a single cloud service.

In response to an access of the cloud service user to a desired cloud service through the access address, the service manager may forward an access attempt from the cloud service user to a cloud that provides a cloud service segment of the desired cloud service.

The service manager supports service migration between clouds when a provider of the cloud service segment is switched from one cloud to another cloud.

The service manager may support service migration that maintains consistency of a cloud service by transmitting only information about a status of the cloud service to the cloud.

The service manager may support service migration by generating an image of the cloud service through snapshot and allowing another cloud to reproduce the cloud service through the image.

In yet another general aspect, there is provided a cloud service broker method including: analyzing cloud information and requirements of a cloud service user for a cloud service request; dividing the requested cloud service into a plurality of cloud service segments according to time intervals based on an analysis; and distributing and placing each of the plurality of cloud service segments to each of clouds using mapping information of the cloud service segments and the clouds.

The dividing of the cloud service into the plurality of cloud service segments may include: selecting an available cloud group consisting of clouds that can provide the cloud service requested by the cloud service user; comparing service prices among the clouds belonging to the available cloud group, time-dividing the requested cloud service into the plurality of cloud service segments, each of which allows the service price to remain in the lowest during each of the time intervals; and designating each of the clouds to each of the cloud service segments.

The time-dividing of the cloud service may include comparing service prices among the clouds that belong to the available cloud group, selecting a cloud that provides the lowest service price at a designated time point, and selecting a cloud service provided by the selected cloud as a cloud service segment for a time interval from the designated time point until another cloud provides a lower service price.

The distribution and placement in each of the clouds comprises requesting a designated cloud for placement of a cloud service segment at a time of use of the requested cloud service, or scheduling placement of a cloud service segment in a designated cloud in order for the cloud service user to use the requested cloud service at a desired time.

The cloud service broker method may further include providing a single access address to the cloud service user such that the cloud service user recognizes the divided cloud service segments as a single cloud service.

The cloud service broker method may further include, in response to an access of the cloud service user to a desired cloud service through the access address, forwarding an access attempt from the cloud service user to a cloud that provides a cloud service segment of the desired cloud service; and supporting service migration between clouds when a provider of the cloud service segment is switched from one cloud to another cloud.

Other features and aspects will be apparent from the following detailed description, the drawings, and the claims.

Figure 1:
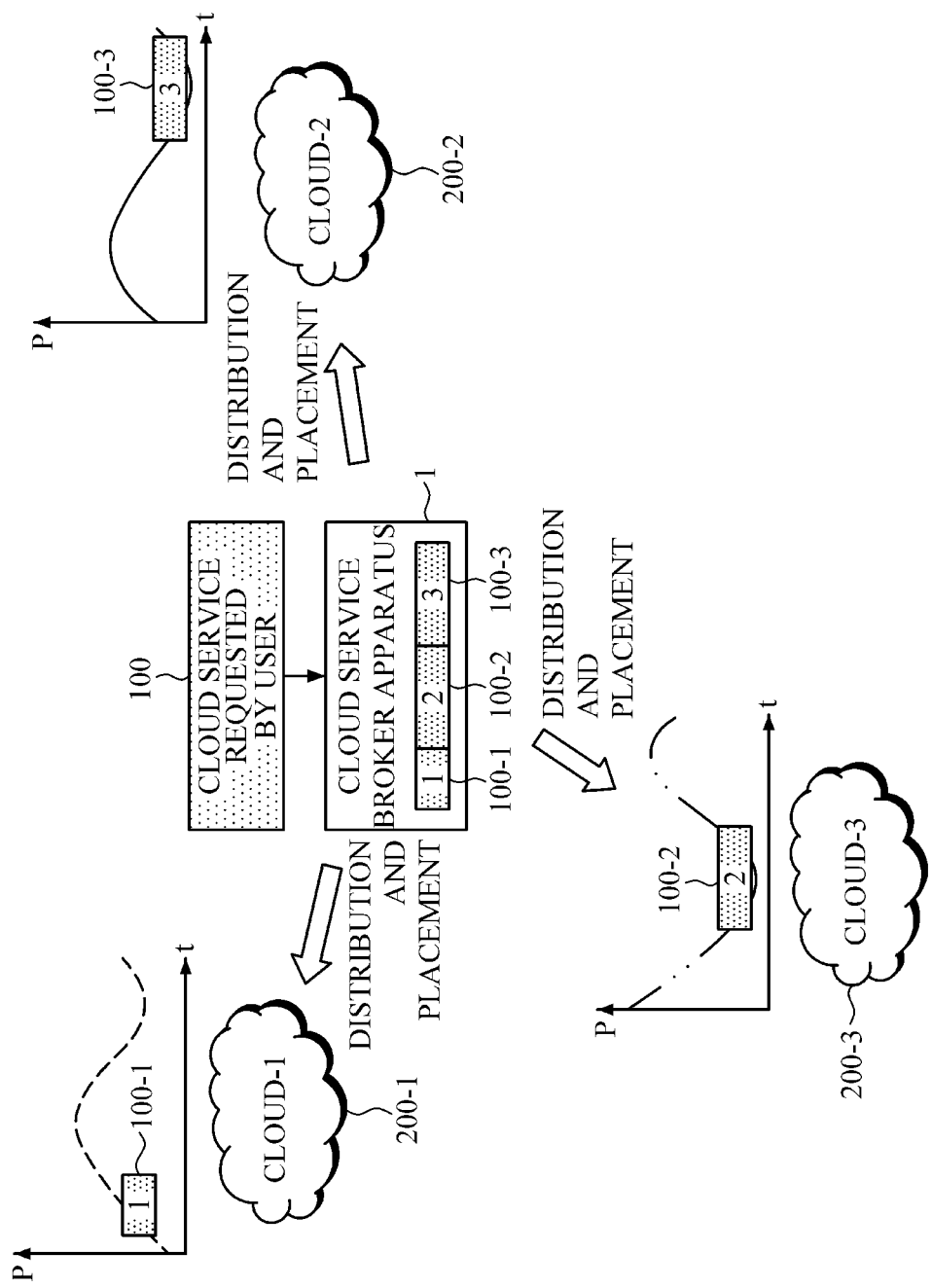
FIG. 1 is a conceptual diagram for explaining the distribution and placement of cloud services by a cloud service broker apparatus according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a conceptual diagram for explaining the distribution and placement of cloud services by a cloud service broker apparatus according to an exemplary embodiment.

Generally, a cloud service provider provides a cloud service at a fixed price or at a price that varies over time. The existing methods for the cloud service provider to provide services only allow the cloud service broker apparatus to deploy only a single cloud service in a single cloud.

However, because geographically distributed clouds are in different conditions and have different policies, they may have different service price distributions. Thus, the cloud service broker apparatus 1 according to the exemplary embodiment is to perform segmentation of a single cloud service into a plurality of cloud service segments and distribute and place the cloud service segments in multiple clouds, thereby being capable of simultaneously utilizing the distributed multiple clouds.

For example, as shown in FIG. 1, the cloud service broker apparatus 1 dynamically distributes and places a cloud service 100 requested by a cloud service user (or a cloud service consumer) in multiple clouds 200-1, 200-2, and 200-3 in order to maximize the advantages of the distributed multiple clouds. At this time, the cloud service broker apparatus 1 divides the requested cloud service into a plurality of cloud service segments 100-1, 100-2, and 100-3, each of which allows the service price p to remain in the lowest over time t. Then, the cloud service broker apparatus 1 distributes and deploys the cloud service segments in the respective clouds 200-1, 200-2, and 200-3. By doing so, the cloud service broker apparatus 1 is able to provide the cloud service user with the cloud service at a lower price.

Figure 2:
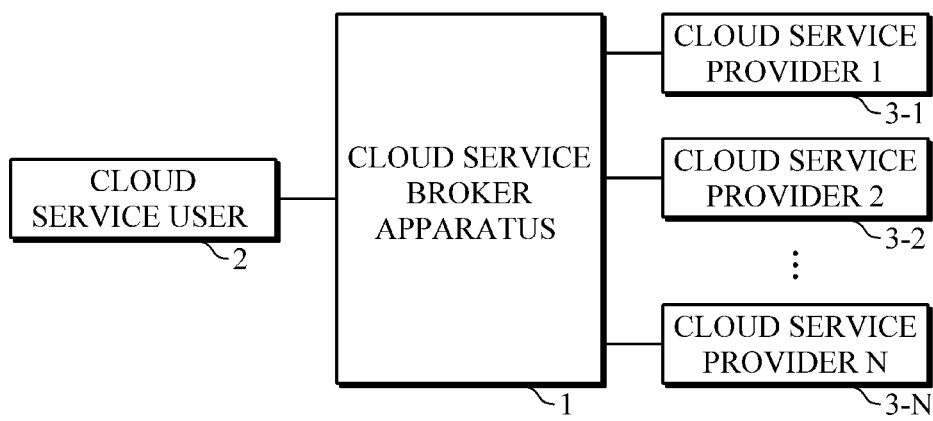
FIG. 2 is a diagram illustrating a configuration of a cloud service system according to an exemplary embodiment.

FIG. 2 is a diagram illustrating a configuration of a cloud service system according to an exemplary embodiment.

Referring to FIG. 2, the cloud service system includes a cloud service user 2, cloud service providers 3-1, 3-2, . . . , and 3-n, and a cloud service broker apparatus 1 that provides a brokerage service between the cloud service user 2 and the cloud service providers 3-1, 3-2, . . . , and 3-n.

The cloud service providers 3-1, 3-2, . . . , and 3-n are geographically distributed. In response to a request from the cloud service user 2, the cloud service broker apparatus 1 selects a cloud suitable for the consumer demand, and requests the selected cloud to execute the requested cloud service.

The cloud service broker apparatus 1 divides the cloud service, which is requested by the cloud service user 2, into a plurality of cloud service segments. Then the cloud service broker apparatus 1 performs the distribution and placement of the plurality of cloud service segments across the clouds. Each of the clouds provides the cloud service segment. In this case, a single cloud service, which is requested by the cloud service user, may be divided into multiple cloud service segments based on the service prices, and then distribution and placement of the cloud service segments in the multiple clouds may be performed.

Figure 3:
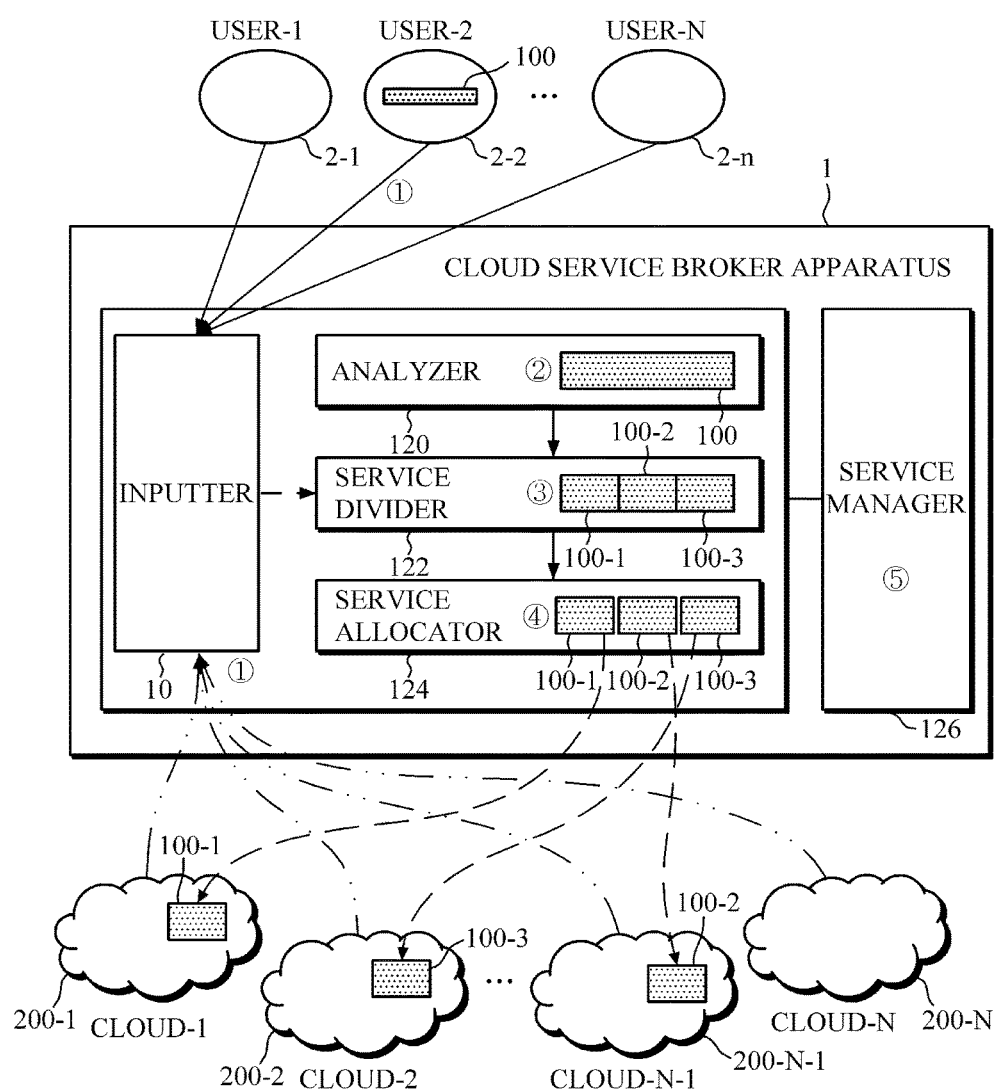
FIG. 3 is a diagram illustrating in detail the cloud service broker apparatus according to an exemplary embodiment.

FIG. 3 is a diagram illustrating in detail the cloud service broker apparatus according to an exemplary embodiment.

Figure 4:
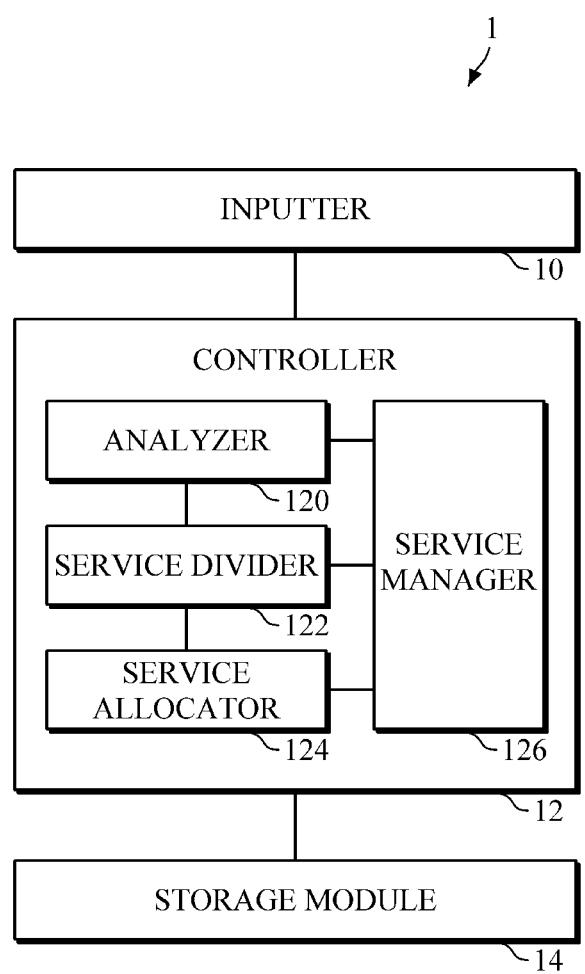
FIG. 4 is a diagram for explaining a cloud service segmentation and distribution, placement process by the cloud service broker apparatus according to an exemplary embodiment.

Referring to FIGS. 3 and 4, the cloud service broker apparatus 1 includes an inputter 10, a controller 12, and a storage module 14. The controller 12 may include an analyzer 120, a service divider 122, a service allocator 124, and a service manager 126.

The inputter 10 collects cloud information of all registered cloud service providers. The cloud information may relate to the types of cloud services offered by each cloud, service prices, service level agreement (SLA), and the like. The inputter 10 receives a cloud service request from the cloud service user. In addition to the request for the cloud service, the inputter 10 may also receive a user's requirements regarding a desired price for the requested cloud service, a type of service, and a performance level of the service.

The analyzer 120 analyzes the cloud information and the requirements for the requested cloud service, which are obtained through the inputter 10. The service divider 122 divides the cloud service requested by the user into a plurality of cloud service segments according to the time interval. In one exemplary embodiment, the service divider 122 selects an available cloud group consisting of clouds that can provide the requested cloud service. Then, the service divider 122 compares service prices among the clouds belonging to the available cloud group, and performs time division on the requested cloud service into cloud service segments, each of which allows the service price to remain in the lowest during each time interval. Then, the service divider 122 designates the cloud to which each of the cloud service segments is mapped.

The service allocator 124 distributes and places the plurality of cloud service segments in the respective clouds using mapping information of the cloud service segments and the clouds. The service manager 126 provides the cloud service user with only one access address in order for the cloud service user to recognize the divided cloud service segments as a single cloud service. The storage module 14 stores the information input through the inputter 10, the analysis from the analyzer 120, and information required for the operations of the controller 12.

FIG. 4 is a diagram for explaining a cloud service segmentation and distribution, placement process by the cloud service broker apparatus according to an exemplary embodiment.

Referring to FIGS. 3 and 4, the inputter 10 obtains all cloud information from the cloud service provider and receives a cloud service request from cloud service user 2-2, as depicted as {circle around (1)}. The cloud information may relate to types of cloud services offered by each cloud, cloud service prices, Service Level Agreement (SLA), etc. The inputter 10 may also receive a desired price for the requested cloud service, the type of cloud service, and the performance level of the requested cloud service, along with the cloud service request from cloud service user 2-2.

Then, the analyzer 120 analyzes the cloud information and user's requirements for the requested cloud service, which are obtained through the inputter 10, as depicted as ②. Thereafter, as depicted as ③, the service divider 122 divides the requested cloud service into a plurality of cloud service segments based on the analysis from the analyzer 120. For example, as shown in FIG. 4, the requested cloud service 100 is divided into three cloud service segments 100-1, 100-2, and 100-3.

Then, as depicted as ④, the service allocator 124 distributes and places the plurality of cloud service segments in the clouds 200-1, 200-2, . . . , 200-n-1, and 200-n, respectively, using the mapping information of the cloud service segments and the clouds. For example, as shown in FIG. 4, cloud service 1 100-1 is placed in cloud-1 200-1, cloud service 2 100-2 is placed in cloud-N-1 200-N-1, and cloud service 3 100-3 is placed in cloud-2 200-2.

As depicted as ⑤, the service manager 126 provides the cloud service user with one access address such that the cloud service user can recognize the divided cloud service segments as a single cloud service.

Figure 5:
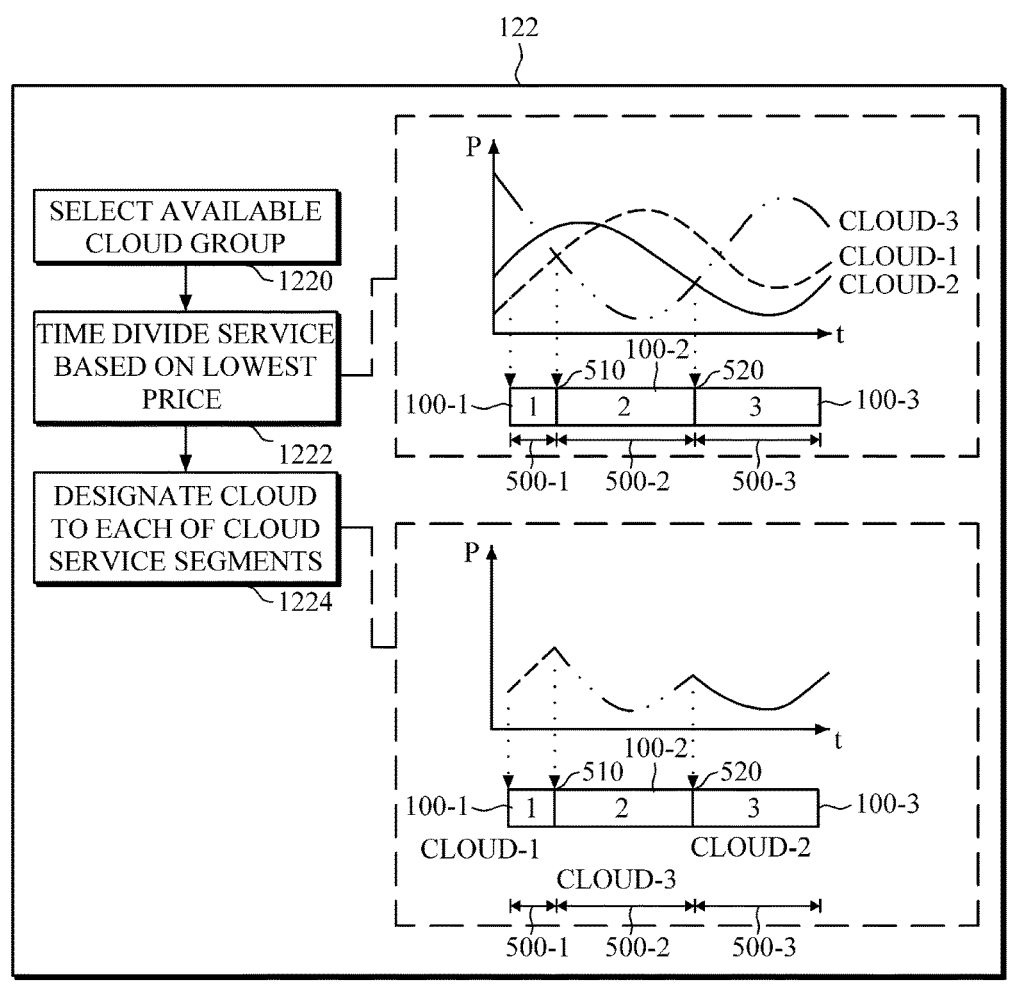
FIG. 5 is a diagram illustrating a service segmentation process by a service divider and an example of service segmentation using a graph of clouds' service prices p over time t.

FIG. 5 is a diagram illustrating a service segmentation process by the service divider and an example of service segmentation using a graph of clouds' service prices p over time t.

Referring to FIG. 5, the service divider 122 may primarily select an available cloud group that can provide the cloud service requested by the user, as depicted in 1220. The service divider 122 may select the available cloud group by analyzing the cloud information and the user's requirements. For example, the available cloud group may be selected based on both the SLA with the cloud service user and the cloud information.

Thereafter, the service divider 122 compares the service prices among the clouds of the available cloud group, and time-divides the requested cloud service into a plurality of cloud service segments, each of which allows the service price p to remain in the lowest during each time interval. In this case, the service divider 122 compares the service prices among the clouds, selects a cloud that supports the lowest service price at a specific time point t, and designates a cloud service provided by the selected cloud as the cloud service segment from the specific time point t until another cloud offers a lower service price. At each time point at which price lines of adjacent clouds cross each other, the service divider 122 performs the service segmentation and switch one cloud service segment to another cloud service segment. The aforesaid service segmentation is repeatedly performed on the total length of cloud service requested by the user.

Herein, an example of the aforesaid process is described with reference to the time t-service price p graph shown in FIG. 5. The example assumes that an available cloud group consists of cloud-1, cloud-2, and cloud-3. The cloud service requested by the user is divided into cloud service segments, each of which is provided by one of the clouds belonging to the available cloud group at the lowest price for a designated time interval. For example, for the first time interval 500-1, cloud service 1 100-1 provided by cloud-1 is selected as the cloud service segment of the requested cloud service; for the second time interval 500-2, cloud service 2 100-2 provided by cloud-3 is selected as the cloud service segment; and for the third time interval 500-3, cloud service 3 100-3 provided by cloud-2 is selected as the cloud service segment. That is, the requested cloud service is time-sequentially divided into cloud service 1 100-1, cloud service 2 100-2, and cloud service 3 100-3. The aforesaid segmentation process is performed on the total length of the cloud service requested by the user. A segmentation time point to perform segmentation of the requested cloud service is determined as the time point at which the service price lines of adjacent clouds cross each other, and in FIG. 5, a time point 510 between the first time interval 500-1 and the second time interval 500-2 and a time point 520 between the second time interval 500-2 and the third time interval 500-3 are the segmentation time points. Then, clouds are designated to the divided cloud service segments, as depicted in 1224. For example, cloud-1 is designated to cloud service 1 100-1 for the first time interval 500-1, cloud-3 is designated to cloud service 2 100-2 for the second time interval 500-2, and cloud-2 is designated to cloud service 3 100-3 for the third time interval 500-3.

Figure 6:
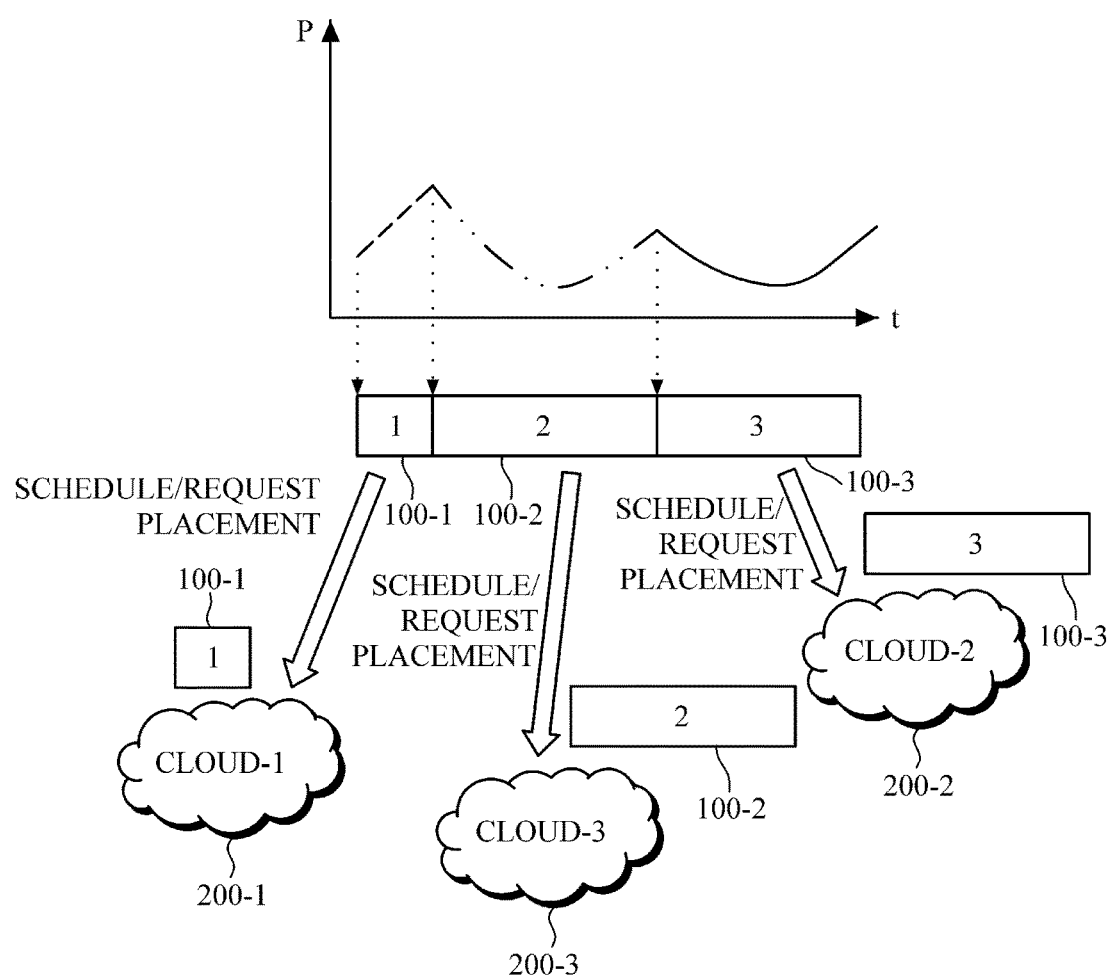
FIG. 6 is a diagram for explaining a service placement process performed by a service allocator according to an exemplary embodiment.

FIG. 6 is a diagram for explaining a service placement process performed by a service allocator according to an exemplary embodiment.

Referring to FIGS. 4 and 6, the service allocator 124 issues a request for the placement of all divided service segments in designated clouds. The service allocator 124 may issue the placement request at the time t when the cloud service is executed, or in the case where a cloud supports scheduling, the service allocator 124 may schedule the placement of cloud service such that the cloud service can be run at the user's desired time. For all cloud service segments, the service allocator 124 issues a request for the cloud service placement to each of the designated clouds, thereby completing the placement of cloud service segments. For example, as shown in FIG. 6, cloud-1 200-1 is requested for the placement of cloud service 1 100-1, cloud-3 200-3 is requested for the placement of cloud service 2 100-2, and cloud-2 200-2 is requested for the placement of cloud service 3 100-3. The aforesaid exemplary embodiment is provided only for easy understanding of the present invention, and aspects of the present disclosure are not limited thereto.

Figure 7:
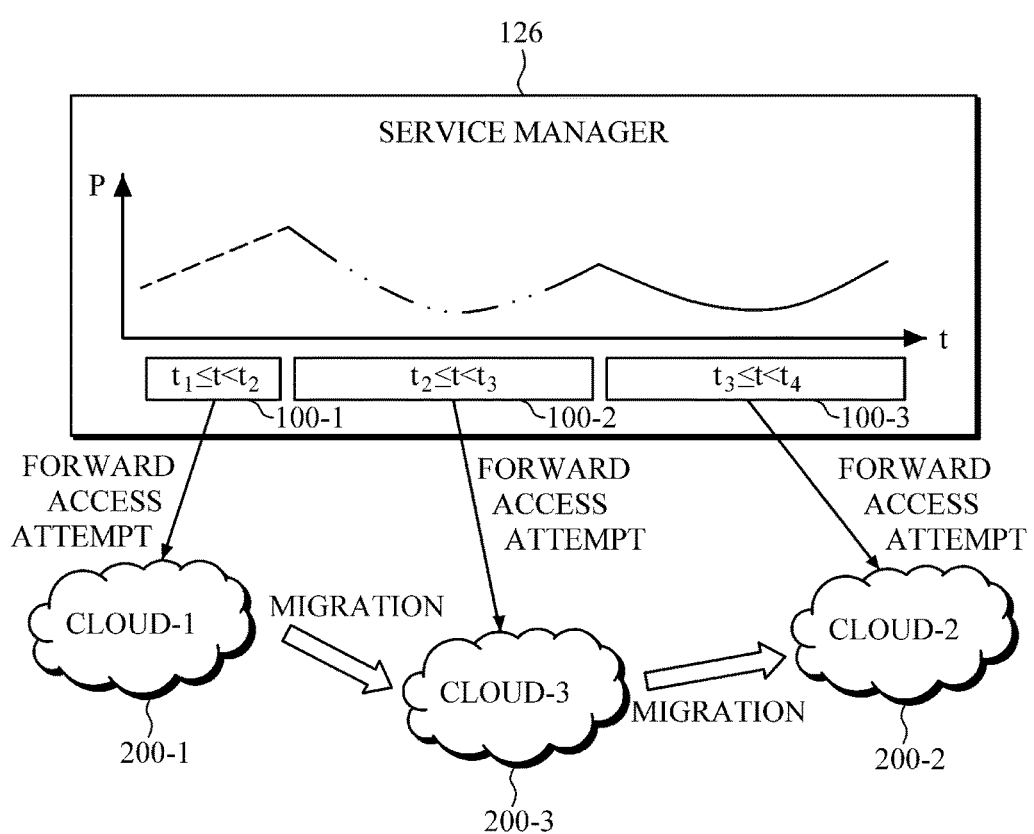
FIG. 7 is a diagram for explaining a service connection management process by the service manager according to an exemplary embodiment.

FIG. 7 is a diagram for explaining a service connection management process by the service manager according to an exemplary embodiment.

Referring to FIG. 7, the service manager 126 provides a single access address to the cloud service user such that the cloud service user can recognize the divided cloud service segments as a single cloud service. As shown in FIG. 7, when the cloud service user accesses the cloud service with the provided single access address, the service manager 126 forwards the access attempt to a cloud designated to the cloud service segment that is associated with time t. For example, if time t at which the cloud service user uses the cloud service is t2≤t≤t3 (100-2), the service manager 126 forwards the access attempt from the cloud service user to a service address of cloud 3 200-3.

The service manager 126 supports service migration between clouds when a provider of the cloud service segment is switched from one cloud to another. For the service migration, there may be used a method of maintaining consistency of service by transmitting only information about the status of cloud service or a method of reproducing the cloud service using an image of the cloud service that has been generated by another cloud through a snapshot. The service manager 126 enables the cloud service user to recognize the divided cloud segments as the single cloud service.

Figure 8:
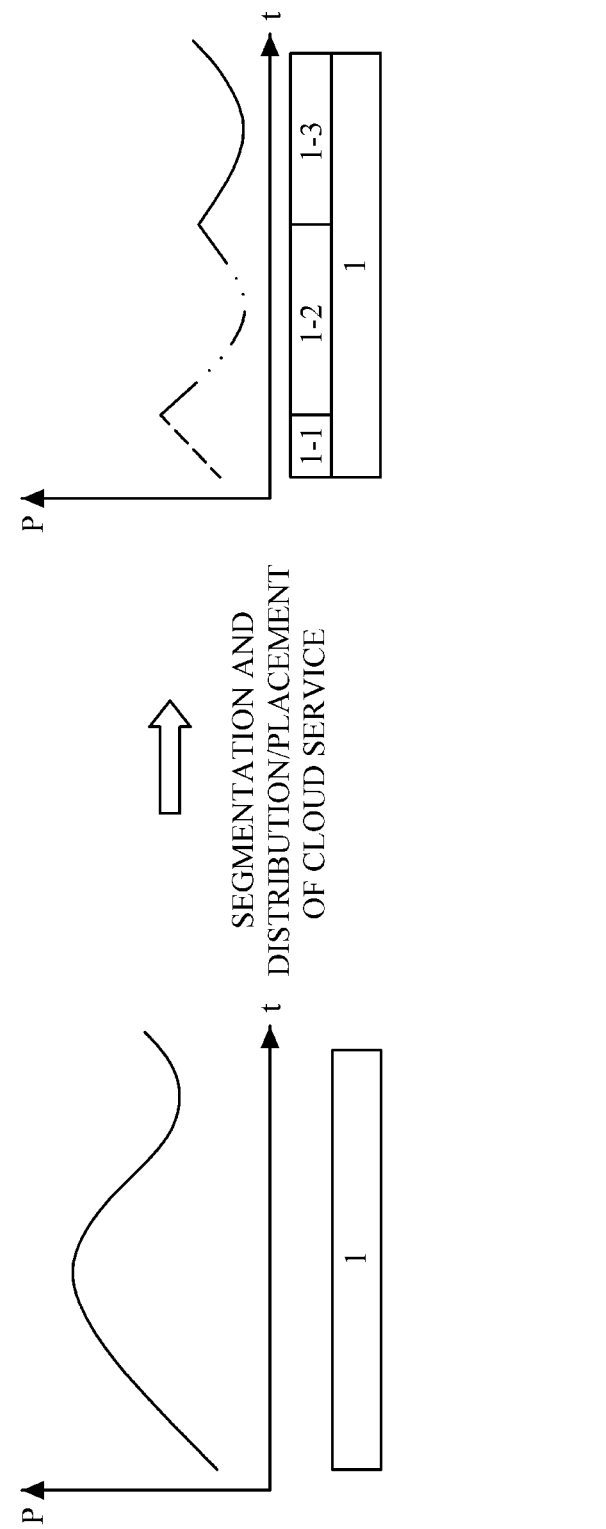
FIG. 8 is a graph showing cloud service prices of clouds over time for explaining the effects of cloud service placement by the cloud service broker apparatus according to the exemplary embodiment.

FIG. 8 is a graph showing cloud service prices of clouds over time for explaining the effects of cloud service placement by the cloud service broker apparatus according to the exemplary embodiment.

Referring to FIG. 8, a single cloud service that is conventionally placed in a single cloud by the cloud service broker apparatus can be placed in a distributed manner to each of multiple clouds that ensures the lowest price for each time interval.

Figure 9:
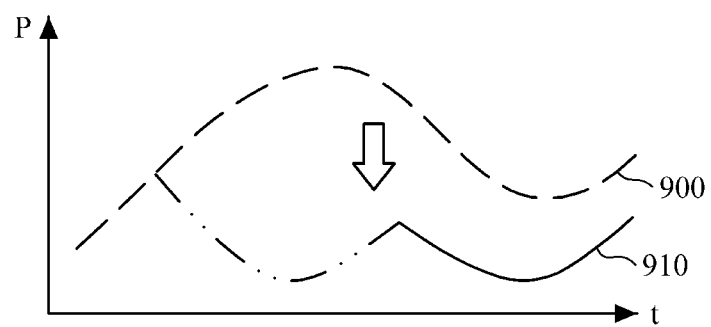
FIG. 9 is a graph showing the cloud service segmentation and distribution according to the exemplary embodiment.

FIG. 9 is a graph showing the cloud service segmentation and distribution according to the exemplary embodiment.

Referring to FIG. 9, the cloud service broker apparatus may reduce the costs for placement of a requested cloud service in a cloud by utilizing multiple clouds. For example, compared to the case 900 where a single cloud service is provided through a single cloud, the cloud service can be provided to the cloud service user at a lower price when a plurality of cloud service segments are placed in multiple clouds by taking into account the service prices according to time. In addition, it is possible to increase a cloud service broker's profit from brokerage.

The cloud service broker apparatus described above is applicable to a cloud service brokerage platform, as well as to a cost-effective service placement method in a federated cloud environment, which is a kind of a cloud service brokerage platform, and in a large-scale single cloud environment in which distributed data centers are operated.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cloud service broker apparatus comprising:
a controller configured to provide a brokerage service between a plurality of cloud service providers in a cloud and a cloud service user by dividing a cloud service requested by the cloud service user into a plurality of cloud service segments and distributing each of the cloud service segments to each of the cloud service providers, the controller including
an analyzer configured to analyze cloud information and requirements of the cloud service user for the cloud service request, the requirements including a length of time specified by the cloud service user for which the user will access the cloud service;
a service divider configured to divide the requested cloud service into the plurality of cloud service segments according to time intervals based on an analysis from the analyzer;
a service allocator configured to distribute and place each of the plurality of cloud service segments in each of cloud service providers using mapping information of the cloud service segments; and
a service manager configured to provide a single access address to the cloud service user such that the cloud service user recognizes the divided cloud service segments as a single cloud service,
wherein the service divider is configured to
select an available cloud group from the cloud that can provide the cloud service requested by the cloud service user,
compare service prices of the cloud service providers belonging to the available cloud group,
time-divide, at division time points, the requested cloud service into the plurality of cloud service segments having an associated time interval, such that the requested cloud service having the length of time specified by the cloud service user is divided into the plurality of cloud service segments having a combined length of time equal to the length of time specified by the cloud service user,
select a cloud service provider that provides the lowest service price for each respective time interval, and
designate each of the cloud service providers in the cloud group to each of the cloud service segments, respectively, wherein the division time points are determined among times between a start time and an end time of the requested cloud service, wherein the requested cloud service is divided based on the division time points so that there is no time gap between adjacent time intervals, wherein the service divider performs service segmentation on the requested cloud service and switches one cloud service segment to another cloud service segment at each time point at which service price lines of adjacent clouds cross each other, and repeatedly performs the cloud service segmentation on the total length of the requested cloud service, wherein in response to a plurality of access attempts to access the cloud service during different cloud service segments among the plurality of cloud service segments, the cloud service broker forwards each respective access attempt to the respective cloud service provider designated for the respective cloud service segment, and wherein the cloud service user generates the plurality of access attempts to access the cloud service by providing the single access address to the cloud service broker during the time intervals corresponding to each of the different cloud service segments.

2. The cloud service broker apparatus of claim 1, wherein the controller divides a single cloud service requested by the cloud service user into the plurality of cloud service segments based on service prices.

3. The cloud service broker apparatus of claim 1, wherein the cloud information includes types of cloud services provided by a cloud, a service provide and Service Level Agreement (SLA), and the requirements for requested cloud service includes a cloud service user's desired service price, type and performance level of requested cloud service.

4. The cloud service broker apparatus of claim 1, wherein the service allocator requests a designated cloud for placement of a cloud service segment at a time of use of the requested cloud service, or schedules placement of a cloud service segment in a designated cloud in order for the cloud service user to use the requested cloud service at a desired time.

5. The cloud service broker apparatus of claim 1, wherein the service manager supports service migration between clouds when a provider of the cloud service segment is switched from one cloud to another cloud.

6. The cloud service broker apparatus of claim 5, wherein the service manager supports service migration that maintains consistency of a cloud service by transmitting only information about a status of the cloud service to the cloud.

7. The cloud service broker apparatus of claim 5, wherein the service manager supports service migration by generating an image of the cloud service through snapshot and allowing another cloud to reproduce the cloud service through the image.

8. A cloud service broker method comprising:

analyzing cloud information and requirements of a cloud service user for a cloud service request, the requirements provided by the cloud service user including a length of time specified by the cloud service user for the requested cloud service;

dividing the requested cloud service into a plurality of cloud service segments according to time intervals based on the analysis, such that the requested cloud service having the length of time specified by the cloud service user is divided into the plurality of cloud service segments having a combined length of time equal to the length of time specified by the cloud service user;

providing a single access address to the cloud service user such that the cloud service user recognizes the divided cloud service segments as a single cloud service; and distributing and placing each of the plurality of cloud service segments to each of a cloud service provider in a cloud group selected from a cloud using mapping information of the cloud service segments, wherein the dividing of the cloud service into the plurality of cloud service segments includes selecting the cloud group consisting of the cloud service providers that can provide the cloud service requested by the cloud service user, comparing service prices among the cloud service providers belonging to the available cloud group, time-dividing, at division time points, the requested cloud service into the plurality of cloud service segments, each of which allows the service price to remain in the lowest during each of the time intervals, selecting the cloud service provider that provides the lowest service price for each time interval, each of which allows the service price to remain the lowest during each of the time intervals from the designated time point until another cloud service provider provides a lower service price, and designating each of the clouds to each of the cloud service segments, wherein the division time points are determined among times between a start time and an end time of the requested cloud service, wherein the requested cloud service is divided based on the division time points so that there is no time gap between adjacent time intervals, wherein the method further includes performing service segmentation on the requested cloud service and switching one cloud service segment to another cloud service segment at each time point at which service price lines of adjacent clouds cross each other, repeatedly performing the cloud service segmentation on a total length of the requested cloud service, and in response to a plurality of access attempts to access the cloud service during different cloud service segments among the plurality of cloud service segments, forwarding each respective access attempt to the respective cloud service provider designated for the respective cloud service segment, and wherein the cloud service user generates the plurality of access attempts to access the cloud service by providing the single access address to the cloud service broker during the time intervals corresponding to each of the different cloud service segments.

9. The cloud service broker method of claim 8, wherein the distribution and placement in each of the clouds comprises requesting a designated cloud for placement of a cloud service segment at a time of use of the requested cloud service, or scheduling placement of a cloud service segment in a designated cloud in order for the cloud service user to use the requested cloud service at a desired time.

* * * * *